United States Patent [19]

Tattermusch

[11] Patent Number: 4,793,432
[45] Date of Patent: Dec. 27, 1988

[54] MOTOR VEHICLE WITH FRONT WHEEL AND REAR WHEEL STEERING, IN PARTICULAR FOUR-WHEEL STEERING

[75] Inventor: Peter Tattermusch, Esslingen, Fed. Rep. of Germany

[73] Assignee: Daimler-Benz Aktiengesellschaft, Stuttgart, Fed. Rep. of Germany

[21] Appl. No.: 103,298

[22] Filed: Oct. 1, 1987

[30] Foreign Application Priority Data

Oct. 1, 1986 [DE] Fed. Rep. of Germany ....... 3633342

[51] Int. Cl.⁴ .............................................. B62D 5/06
[52] U.S. Cl. ..................................... 180/142; 280/91
[58] Field of Search .................. 280/91; 180/141, 142, 180/140

[56] References Cited

U.S. PATENT DOCUMENTS

| 4,572,316 | 2/1986 | Kamazawa et al. | 280/91 |
| 4,621,702 | 11/1986 | Kamazawa et al. | 280/91 |
| 4,660,844 | 4/1987 | Yamamoto et al. | 280/91 |
| 4,673,189 | 6/1987 | Kamazawa et al. | 280/91 |
| 4,687,216 | 8/1987 | Kawamoto et al. | 280/91 |
| 4,700,960 | 10/1987 | Miki et al. | 280/91 |
| 4,706,979 | 11/1987 | Kawabe et al. | 280/91 |

FOREIGN PATENT DOCUMENTS 3124821 3/1982 Fed. Rep. of Germany .
3506048 2/1985 Fed. Rep. of Germany .

*Primary Examiner*—Kenneth R. Rice
*Attorney, Agent, or Firm*—Barnes & Thornburg

[57] ABSTRACT

Motor vehicle with front and rear wheel steering, in particular four-wheel steering. The rear wheels are controlled in the same sense as the front wheels but with reduced steering deflection. The steering movement of the rear wheels follows the steering movement of the front wheels with a variable delay period which decreases with increasing lock rate of the front wheels. In addition, the lock rate of the rear wheels increases with increasing lock rate of the front wheels.

10 Claims, 1 Drawing Sheet

MOTOR VEHICLE WITH FRONT WHEEL AND REAR WHEEL STEERING, IN PARTICULAR FOUR-WHEEL STEERING

BACKGROUND AND SUMMARY OF THE INVENTION

The present invention relates to a motor vehicle with front and rear wheel steering, in particular four-wheel steering, which permits the front and rear wheel to be steered in the same sense but with reduced steering lock at the rear wheels in comparison with the front wheels, the lock rate of the rear wheels increasing with increasing lock rate of the front wheels.

A passenger motor vehicle with steering of this type is described in German Published Unexamined Patent Application No. 3,124,821. The additional steering of the rear wheels is used in order to permit a large rear wheel skew angle without a corresponding rotation of the vehicle about its vertical axis, particularly in the case of high speeds in a curve. At high travelling speeds the intersection line between the plane of the wheel and the plane of the road in the region of the particular wheel contact surface is not in fact exactly tangential to the center of the curve, even for ideal steering geometry of the vehicle, because slip in the transverse direction of the vehicle occurs to a greater or lesser extent. Because of this slip, the intersection line mentioned tends rather to form an angle with the tangent, through the wheel support surface, to the center of the curve being currently traversed. The intersection line in the direction of travel passes through the tangent towards the inside of the curve. This angle, designated the skew angle, appears at high travelling speeds in unsteered rear wheels because the vehicle drifts somewhat and therefore rotates slightly about its vertical axis because, for example, the rear of the vehicle moves towards the outside of the curve.

In the vehicle described in German Published Unexamined Patent Application No. 3,124,821, the necessary skew angle of the rear wheels can be achieved by the additional steering of the rear wheels, so that the skew position of the rear wheels can in this case, therefore, be attained without additional rotation of the vehicle about its vertical axis.

In order to permit the rear wheel steering to be adapted to the particular driving situations, the German Application No. 3,124,821 provides for there to be a proportionality relationship, which depends on the travelling speed, between the steering angle of the front wheels and the steering angle of the rear wheels. The steering of the rear wheels therefore takes place simultaneously with the steering of the front wheels and only the ratio between the steering angles changes with speed.

Provision is made in the CUE-X test vehicle of the NISSAN Company to deflect the rear wheels as a function of the transverse acceleration of the vehicle.

In both the steering system described in German Application No. 3,124,821 and the CUE-X test vehicle of the NISSAN Company, the rear wheel steering counters the tendency of the rear of the vehicle to move outwards when driven rapidly around curves. No allowance, however, is made for the fact that this effect is not desirable under all circumstances. The particular rear wheel steering system really only offers an advantage in a sudden change of lane when driving rapidly or on so-called twisting roads because control of the vehicle is facilitated by it, particularly for an unpracticed driver. In steady travel around a curve, when a long bend with a substantially constant radius of curvature is traversed, however, the additional rear wheel control provides no additional security effect. The whole steering of the vehicle tends rather to become less direct because, due to the rear wheel lock in the same sense as the front wheel lock, the actual radius of the curvature is increased compared with a vehicle whose front wheels have the same lock and whose rear wheels are in the straight ahead position.

In the case of special heavy load vehicles, for example those for the transport of large rockets, ship hulls, etc., so-called all-wheel steering, in which the front wheels and the rear wheels are deflected in rotational directions opposite to one another, is usual. This increases the turning capability of the vehicle, so that the vehicle has an extremely small minimum turning circle diameter compared with its size. Corresponding steering systems have already been designed for four wheel vehicles and have also been produced in series on constructional vehicles. For example, such steering systems have been produced particularly in the form of so-called articulated vehicles in which the front half of the vehicle, solidly connected to the front axle, and the rear half of the vehicle, solidly connected to the rear axle, are connected together by a pin-joint with the pin-joint axis parallel to the vertical axis of the vehicle.

In German Published Unexamined Patent Application No. 3,506,048, a four-wheel vehicle, in particular a passenger motor vehicle, with four-wheel steering is described in which the rear wheels are deflected in the opposite sense to the front wheels during very slow travel and in the same sense as the front wheels during rapid travel. This is intended to make the vehicle more controllable at higher travelling speed whereas, at low travelling speed, which occurs particularly during parking maneuvers the purpose is to achieve a very small turning radius.

Otherwise, no more precise information is given in German Application No. 3,506,048 with respect to the steering of the rear wheels at higher travelling speeds so that the same difficulties must be expected in this connection as in four-wheel steering according to German Application No. 3,424,81 and in the CUE-X test vehicle of the Nissan Company.

In connection with the opposite sense steering of the front and rear wheels during slow travel, provision is made in German Application No. 3,506,048 for the steering lock at any particular time of the rear wheels, diametrically opposed to the steering deflection of the front wheels, to be only gradually reduced corresponding to the distance traversed by the vehicle. This is intended to make the vehicle more controllable between obstacles. If, in fact, the rear wheels are deflected in the opposite sense to the front wheels, the rear of the vehicle will shear out towards the outside of the curve, when driven forward, in comparison with a vehicle whose rear wheels are in the straight ahead position. This can lead to difficulties, particular if the vehicle has to be driven out of parking gaps or between adjacent posts.

An object of the present invention is to produce a motor vehicle with front and rear wheel steering, in particular four-wheel steering, in which the rear wheel steering only becomes active in particular driving situations and deflects the rear wheels in the same direction as tee front wheels in order to make the vehicle easier to control by means of the resulting increased skew angle of the rear wheels of the vehicle.

This and other objects are achieved in a motor vehicle having front and rear wheel steering by providing a control device for causing the rear wheel steering to follow the front wheel steering with a variable delay period which decreases with the increasing lock rate of the front wheels. The control drive also causes the lock rate in the rear wheels to be influenced, either directly or indirectly, by the transverse acceleration of the vehicle.

The invention is based on the general idea that a high lock rate of the vehicle steering is really only present in critical driving situations, for example when at high travelling speed, the lane is suddenly changed in a sort of twisting maneuver because an obstacle has suddenly appeared. Another example is when a steering correction has to take place during curved travel. It is only during such critical driving situations that the steering wheel is moved relative violently. This, however, means that the lock rate, which is the speed with which the steering wheel is moved, is evidence of driving maneuvers in critical situations.

Because of the delay period provided by the present invention, the reaction of the vehicle to movements of the steering wheel is initially left unaltered. In the case of short term steering corrections only, the driver can expect that the vehicle will respond to the movement of the steering wheel in the same manner as a vehicle without rear wheel steering. Only in the case of very marked steering movements at a high steering rate does the rear wheel steering become effective and act against a drift of the rear of the vehicle to the outside of the curve. This also achieves the effect that in case of failure or blocking of the rear wheel steering in the straight ahead position, the vehicle exhibits a substantially similar steering behavior to that with rear wheel steering.

In accordance with the invention, therefore, the rear wheel steering is practically only employed in driving situations which are not of a steady state nature and in which the additional rear wheel steering provides substantial advantages.

In order to avoid the rear wheel steering also becoming effective in slow speed travel, provision is preferably made for the delay period to increase with decreasing travelling speed and for the rear wheel lock rate to decrease with decreasing travelling speed. This particularly avoids the rear wheel steering becoming effective during parking maneuvers with rapid steering wheel movements and leading to undesirable indirect vehicle steering.

For purposes of simple design and control, provision is made in certain preferred embodiments for the maximum lock angle of the rear wheels to be constant independent of the parameters.

Fundamentally, however,, it is also contemplated to provide rear wheel steering with variable maximum lock angle, the lock angle increasing, for example, with increasing front wheel lock rate.

In addition, the delay period and the rear wheel lock rate also depend on the frictional connection between the wheels and the road or on associated torque which has to be applied to actuate the vehicle steering, in certain preferred embodiments. Furthermore, it is also contemplated to control the delay period and the rear wheel lock rate as a function of the transverse acceleration of the vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
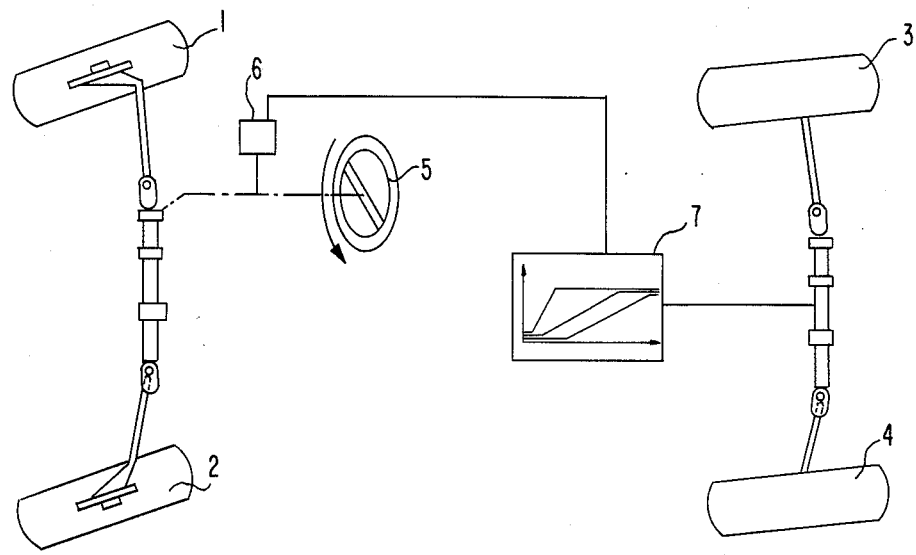
FIG. 1 is a diagrammatic plan view of the running gear of the motor vehicle with four-wheel steering during travel in a curve.

From FIG. 1, the vehicle has steering of the front wheels 1 and 2 which is, in principle, conventional. In addition, computer controlled steering of the rear wheels 3 and 4 is provided. In the case of very violent movement of the steering wheel 5, such as at a high lock rate of the front wheels 1 and 2, the rear wheels 3 and 4 are provided with lock i the same sense as the front wheels 1 and 2 but with a substantially smaller steering angle.

The rear wheel steering is controlled by a computer 7, schematically shown in FIG. 1, in dependence, for example, on the lock rate sensed by a lock rate sensor 6. The mechanism for steering the rear wheels can be an arrangement such as in German Published Unexamined Patent Applications No. 3,124,821 and 3,506,048, described earlier, with fluidic values and a pump.

Figure 2:
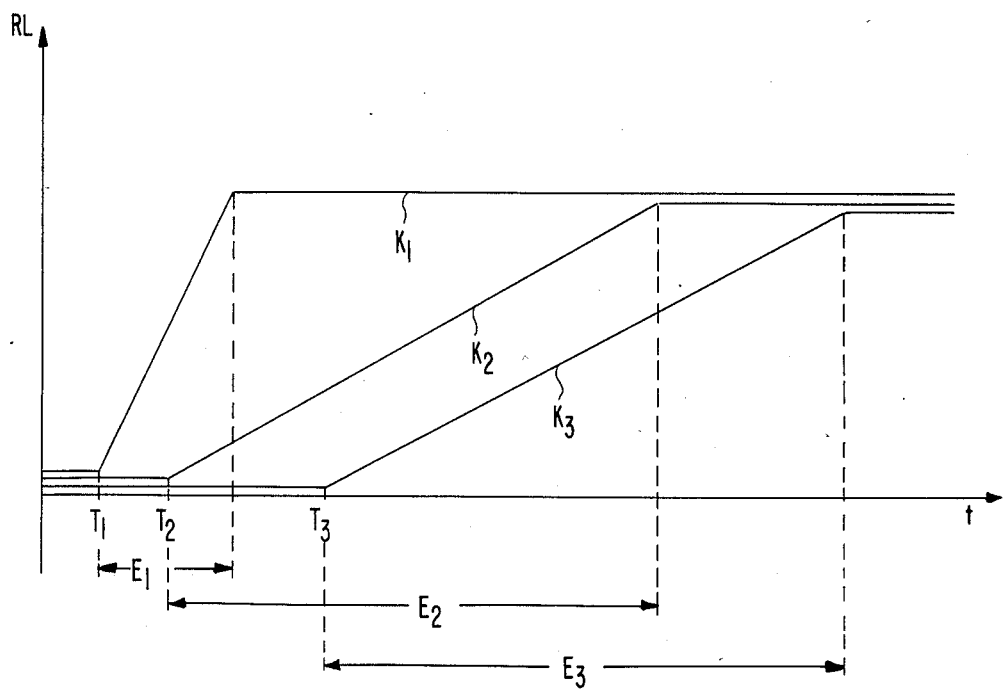
FIG. 2 is a diagram which shows the wheel lock of the rear wheels as a function of time for various driving situations.

The wheel lock RL of the rear wheels by the computer 7 is shown graphically in FIG. 2 as a function of time t. In this figure, curve $K_1$ refers to a driving situation with a very high lock rate of the front wheels 1 and 2 whereas the curves $K_2$ and $K_3$ show the relationships with increasingly reduced lock rate of the front wheels. The rear wheel steering becomes correspondingly effective after respective delay periods of $T_1$, Thd 2, $T_3$ which decrease with increasing lock rate of the front wheels.

Corresponding conditions apply to the lock times $E_1$, $E_2$, $E_3$ required before the maximum lock angle of the rear wheels can be attained. The lock times $E_1$ to $E_3$ are therefore reduced with increased lock rate of the front wheels.

In addition, provision is preferably made for the delay periods $T_1$ to $T_3$ mentioned and the lock times $E_1$ to $E_3$ to be also reduced when the travelling speed of the vehicle, its transverse acceleration and/or the frictional connection between the tires and the road (or the associate torque which has to be applied to actuate the vehicle steering) increases.

Since the lock rate of the front wheels 1 and 2, which depends on the value of the coefficient of friction ($\mu$), is also a measure of the change to the transverse acceleration of the vehicle, it is also contemplated to control the delay period and the lock rate of the rear steering as a function of the change in transverse acceleration of the vehicle instead of as a function of the lock rate of the front wheels.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A motor vehicle with front wheel steering and rear wheel steering, in particular four-wheel steering, in which front and rear wheels are steerable in the same sense but with less steering deflection at said rear wheels in comparison to said front wheels, a lock rate of said rear wheels increasing with increasing lock rate of said front wheels, comprising: control means for causing said rear wheel to follow said front wheel steering with a variable delay period which decreases with said increasing lock rate of said front wheels, and for causing said lock rate of said rear wheels to be influenced by transverse acceleration of said vehicle.

2. A motor vehicle with front wheel steering and rear wheel steering, in particular four-wheel steering, in which front and rear wheels are steerable in the same sense but with less steering deflection at said rear wheels comparison to said front wheels, a lock rate of said rear wheels increasing with increasing lock rate of said front wheels, comprising: control means for causing said rear wheel to follow said front wheel steering with a variable delay period which decreases with said increasing lock rate of said front wheels, and for causing said lock rate of said rear wheels to be influenced by transverse acceleration of said vehicle, wherein said control means causes increases in said delay period with decreasing traveling speed of said vehicle.

3. A motor vehicle according to claim 2, wherein said control means causes decreases in said lock rate of said rear wheels with decreasing speed.

4. A motor vehicle according to claim 3, wherein said control means causes said delay period and said lock rate of said rear wheels to be in dependence on adhesion between said wheels and a road and on steering torque.

5. A motor vehicle according to claim 4, wherein said control means decreases said delay period with increasing transverse acceleration of said vehicle.

6. A motor vehicle according to claim 5, wherein said control means increases said lock rate of said rear wheels with increasingly transverse acceleration of said vehicle.

7. A motor vehicle according to claim 6, wherein said control means causes a maximum lock of said rear wheels which is constant and independent of parameters.

8. A motor vehicle according to claim 6, wherein said control means causes a maximum lock of said rear wheels which increases at high front wheel lock rates.

9. A motor vehicle according to claim 1, wherein said control means causes a maximum lock of said rear wheels which is constant and independent of parameters.

10. A motor vehicle according to claim 1, wherein said control means causes a maximum lock of the rear wheels which increases at high front wheel lock rates.

* * * * *